J. R. FLAHERTY.
SAW SET.
APPLICATION FILED APR. 16, 1910.
995,590.
Patented June 20, 1911.
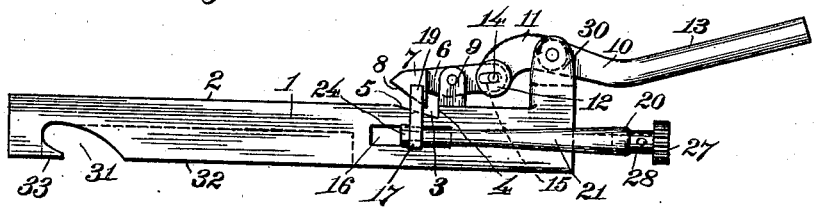
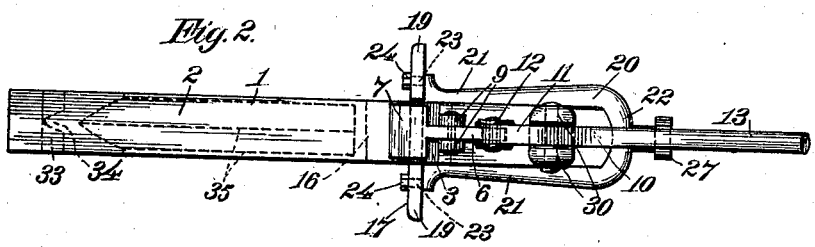
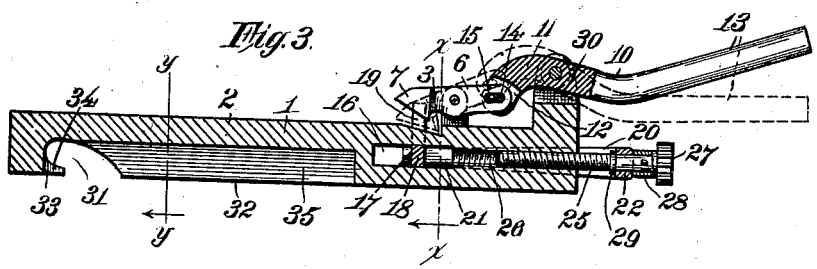
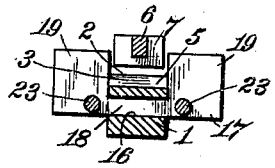 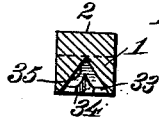
Witnesses
Inventor
James R. Flaherty
By Joshua R. H. Potts
Attorney

UNITED STATES PATENT OFFICE.

JAMES ROBT. FLAHERTY, OF DANCY, MISSISSIPPI.

SAW-SET.

995,590.  Specification of Letters Patent.  Patented June 20, 1911.

Application filed April 16, 1910. Serial No. 555,893.

*To all whom it may concern:*

Be it known that I, JAMES R. FLAHERTY, a citizen of the United States, residing at Dancy, county of Webster, and State of Mississippi, have invented certain new and useful Improvements in Saw-Sets, of which the following is a specification.

My invention relates to saw sets and the object of my invention is to provided an improved saw set which shall be of simple construction and easy to operate.

A further object of my invention is to provide a saw set with improved means for adjusting the same for saw teeth of various lengths and to give the desired set to the same.

A further object of my invention is to provide a device of the class mentioned particularly adapted for setting the teeth of cross cut saws such as used in sawing heavy timber.

A further object of my invention is to provide a saw set with improved means for attaching the same to a stump, tree or other convenient place.

Other objects will appear hereinafter.

With these objects in view my invention consists generally in a saw set comprising a base member or body portion having a transverse groove in its upper face formed with an inclined surface, a lever pivotally mounted adjacent said groove and carrying a presser block or hammer which when depressed conforms to or lies parallel with said inclined surface, and means for actuating said lever.

My invention further consists in a saw set as above mentioned in combination with a lever for actuating the hammer carrying lever whereby the hammer may be operated by a downward pressure on the actuating lever.

My invention further consists in a saw set of the character mentioned in which the base is provided with a transverse slot underlying the above mentioned groove, a member extending transversely through said slot and slidably mounted therein and provided with end portions extending upwardly upon each side of the base and above the upper face thereof and means for adjusting said member with relation to said groove and for maintaining the same in adjusted position.

My invention further consists in a saw set as above mentioned provided with the transverse member forming a gage, a yoke extending about the end of the base or body portion and connected with said member and an adjusting screw extending through said yoke and threaded into said base whereby turning of the screw will adjust said member with relation to the groove in the upper face of the base.

My invention further consists in an elongated base or body equipped with saw setting means at one end, the opposite end being notched or recessed transversely forming an inwardly extending tongue or flange on the under side thereof, said tongue or flange being bifurcated or notched to form a recess to receive a nail or the like whereby the device may be readily attached to a stump, tree or other convenient place for use and readily removed therefrom when desired.

My invention further consists in various details of construction and arrangements of parts all as will be fully described hereinafter and particularly pointed out in the claim.

My invention will be more readily understood by reference to the accompanying drawings forming a part of this specification and in which—

Figure 1 is a side elevation of a saw set embodying my invention in its preferred form, Fig. 2 is a top plan view of the same, Fig. 3 is a vertical longitudinal section through the device, Fig. 4 is a transverse section on substantially the line $x$—$x$ of Fig. 3, and Fig. 5 is a transverse section on the line $y$—$y$ of Fig. 3.

Referring now to the drawings 1 indicates the body or base of the device. This is preferably an elongated metal casting, rectangular in cross-section. Extending transversely across the upper face 2 of the base is a groove 3 having a vertical face 4 and an inclined face 5. Pivotally mounted adjacent the groove 3 is a short lever 6 upon one end of which is formed a block or hammer 7 having a beveled face 8 which conforms to or lies parallel with the face 5 of the groove when said hammer is in lowermost position. The lever 6 is pivotally mounted in a pair of ears 9 formed integrally with the base 1 and extending upwardly therefrom preferably contiguous to the face 4 of the groove, the hammer 7 and the respective end of the lever 6 overhanging said groove.

Pivotally mounted in longitudinal alinement with the lever 6 is an actuating lever 10. This comprises a curved arm 11 having a bifurcated end 12 to receive the end of the lever 6 opposite the hammer, and a straight arm or handle 13. A pin 14 extends through the bifurcated end 12 of the lever 10 and through a slot 15 formed in the lever 6 as shown in dotted lines in Fig. 1 and in full lines in Fig. 3. It is obvious that by depressing the arm 13 of the lever 10 the block or hammer 7 will be depressed into the groove 3. In using the device the saw is laid upon the upper face 2 of the body with a tooth extending over the groove 3, and a handle 13 depressed so as to bring the hammer into contact with the tooth and give the same the proper set.

In order to give a uniform set to all of the teeth of a saw, and to accommodate saws having teeth of various lengths, I provide an adjustable gage member, and means for adjusting the same. Extending transversely through the base block 1 and underlying the groove 3 is a slot 16. Slidably mounted in said slot is a member 17 which comprises the vertically disposed plate having its central portion 18 reduced to fit within the slot 16 and its projecting end portions extending upwardly as at 19 above the upper surface 2 of the body and upon each side of the hammer 7. Embracing the adjacent end of the body 1 is a yoke 20 comprising a pair of parallel arms 21, the inner faces of which preferably fit snugly against the sides of the base, and a transverse portion 22 connecting the same. The ends of the arms 21 are connected to the gage plate 17. To this end said arms are provided with threaded extensions 23 extending through perforations in said plate and equipped with nuts 24 for holding the same firmly in position. Swiveled in the portion 22 of the yoke is a screw 25, the end of which is threaded into the base 1, said base being provided with a threaded bore 26 to receive the same, said screw and said bore being horizontally disposed. Fixed to the outer end of the screw 25 is a knurled head 27 by means of which the screw is turned. Said head is provided with a sleeve 28 fitting the end of the screw and abutting the transverse portion of the yoke as shown clearly in Fig. 3, and said screw is provided with an annular flange or collar 29 bearing against the inner face of said transverse portion. The portion 22 of the yoke is thus held between the sleeve 28 and the collar 29 so that as the screw is turned the yoke will be positively moved and also held firmly in adjusted position. It is obvious that by turning the screw 25 the gage plate 17 will be moved with relation to the groove 3. In using the device the ends of the saw teeth are placed against the outer face of the plate 17 and therefore by adjusting said plate as described, the teeth of the saw are allowed to project over the groove a sufficient distance to give the desired set thereto and to accommodate teeth of various lengths.

The saw setting mechanism above described is preferably arranged at one end of the elongated base 1, the lever 10 being pivotally mounted between ears 30 projecting upwardly from the end of the base and the actuating handle 13 extending outwardly a considerable distance beyond the base and the yoke adjusting head 27 as shown clearly in the several figures of the drawing. By this construction the danger of mashing the fingers of the hand grasping the handle 13 between the same and other portions of the device is avoided.

The opposite end of the body 1 from that upon which the saw setting mechanism is arranged is provided with a transverse notch or groove 31 which extends diagonally upwardly and outwardly from the under face 32 of the body, forming an inwardly extending tongue or flange 33 which is provided with a notch 34 to receive a nail or similar holding means. By this construction the device may be readily held in position for use by a nail driven in a stump, tree or other convenient place, and as readily removed therefrom. To facilitate placing the device over the nail, and to lighten the weight of the body, the body is provided in its under face with a longitudinally disposed groove 35 which extends from the notch 31 almost to the slot 16 as shown clearly in Figs. 3 and 5.

Having described my invention what I claim as new and desire to secure by Letters Patent is:—

In a saw set a base, an inclined face formed thereon, a hammer mounted adjacent said face and adapted to coöperate therewith, means for actuating said hammer, a gage comprising a vertically disposed plate and means for adjusting the same longitudinally of said body with relation to said inclined face, said body being provided with a slot extending transversely therethrough and the central portion of said plate being reduced to fit within said slot, substantially as described.

In testimony whereof I have signed my name to this specification in the presence of two subscribing witnesses.

JAMES ROBT. FLAHERTY.

Witnesses:
C. N. RAY,
G. W. JOHNSON.

Copies of this patent may be obtained for five cents each, by addressing the "Commissioner of Patents, Washington, D. C."